United States Patent
Al-Yousif

(10) Patent No.: US 9,392,411 B1
(45) Date of Patent: Jul. 12, 2016

(54) ITEM AND OBJECT LOCATION SYSTEM

(71) Applicant: Ahmed Khalifa Al-Yousif, Abu Dhabi (AE)

(72) Inventor: Ahmed Khalifa Al-Yousif, Abu Dhabi (AE)

( * ) Notice: Subject to any disclaimer, the term of this patent is extended or adjusted under 35 U.S.C. 154(b) by 175 days.

(21) Appl. No.: 14/247,898

(22) Filed: Apr. 8, 2014

(51) Int. Cl.
*G08B 1/08* (2006.01)
*H04W 4/02* (2009.01)
*G08B 21/18* (2006.01)
*H04M 1/725* (2006.01)

(52) U.S. Cl.
CPC .............. *H04W 4/023* (2013.01); *G08B 21/18* (2013.01); *H04M 1/7253* (2013.01)

(58) Field of Classification Search
CPC .............. G08B 13/1427; G08B 21/24; G08B 21/0275; G08B 25/10; H04W 4/02; H04W 64/00; H04W 8/005; H04W 4/008; H04W 4/04; G06K 2017/0045; E05B 73/0017; H04M 1/7253; H04M 1/72572; H04M 2203/2094; H04M 2250/06; H04M 3/42348; A63B 2220/14
See application file for complete search history.

(56) References Cited

U.S. PATENT DOCUMENTS

| | | | |
|---|---|---|---|
| 5,340,968 A | 8/1994 | Watanabe et al. | |
| 6,265,975 B1 | 7/2001 | Zimmerman | |
| 6,624,752 B2 | 9/2003 | Klitsgaard et al. | |
| 6,700,533 B1 | 3/2004 | Werb et al. | |
| 6,842,121 B1 | 1/2005 | Tuttle | |
| 7,535,358 B2 | 5/2009 | Crider et al. | |
| 7,916,025 B2 * | 3/2011 | Locker ............... | G08B 13/1427 340/539.11 |
| 8,253,557 B2 | 8/2012 | Ani et al. | |
| 2006/0206604 A1 * | 9/2006 | O'Neil ............... | H04L 65/1063 709/223 |
| 2009/0243853 A1 * | 10/2009 | Breslau ............... | G06Q 10/08 340/572.1 |
| 2015/0261986 A1 * | 9/2015 | Ekbatani ............ | G06K 7/10366 340/8.1 |

FOREIGN PATENT DOCUMENTS

| | | |
|---|---|---|
| WO | WO99/46742 | 9/1999 |
| WO | WO2008/060313 | 5/2008 |

\* cited by examiner

*Primary Examiner* — Kerri McNally
*Assistant Examiner* — Renee Dorsey
(74) *Attorney, Agent, or Firm* — Michael I. Kroll

(57) ABSTRACT

A location system for luggage and the like is disclosed. A locator chip is attached to the luggage and an app is downloaded into a smartphone. When the chip's unique ID number is entered through the app into the phone a long range and short range location system is activated. The long range system uses GPS to display the location of both the phone and the identified chip on a map and when the user is close enough the short range system uses NFC (near field communication) to provide a directional arrow pointing to the chip on the phone display.

16 Claims, 7 Drawing Sheets

ITEM AND OBJECT LOCATION SYSTEM

BACKGROUND OF THE INVENTION

1. Field of the Invention

Figure 1:
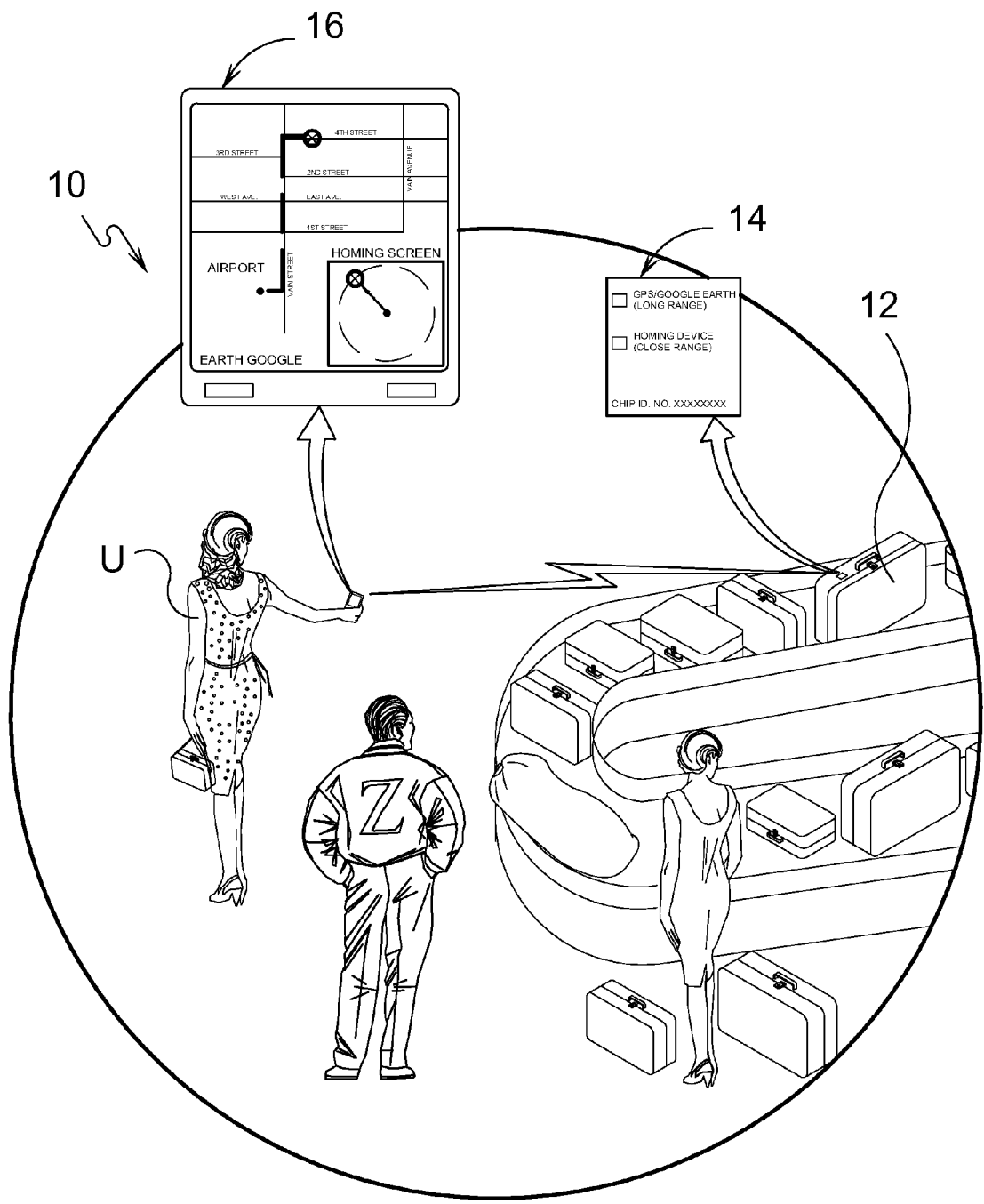

The present invention relates generally to article location devices and, more specifically, to an article locator device that can be releasably attached to an article to be tracked and a computer application for a smartphone for locating the article having the attached article locator device.

2. Description of the Prior Art

There are other systems which provide for tracking tagged articles. While these systems may be suitable for the purposes for which they where designed, they would not be as suitable for the purposes of the present invention as heretofore described.

It is thus desirable to provide a computer application (app) for a smartphone and a locator device whereby a user can attach the locator device to a desired article then locate the article, such as luggage, using the app enabled smartphone.

It is further desirable to provide an article locator device having fasteners means for releasably attaching the tracking module to a desired article.

SUMMARY OF THE PRESENT INVENTION

A primary object of the present invention is to provide location means for an article comprising a smartphone app and an article locator device responsive to said app so that the article locator device can be releasably attached to said article where then actuating the smartphone app will display a map-like image indicating the location of the tagged article relative to the smartphone.

Another object of the present invention is to provide an article locator device incorporating a two-tiered system with an NFC RFID tag for locating articles within a local area and a GPS tag for locating articles outside the local area.

Yet another object of the present invention is to provide an article locator device wherein said app performs a near field communication task (local area) using the RFID tag and a cellular network communications task (outside the local area) using the GPS tag.

Still yet another object of the present invention is to optionally provide an article locator device wherein said app can perform a worldwide location task using satellites and the GPS tag on the device.

An additional object of the present invention is to optionally provide an article locator device wherein said GPS incorporates a SIM card whereby said tag can employ the phones (Short Message Service) SMS to send a message to the smartphone indicating the articles location.

A further object of the present invention is to provide an article locator system wherein said app provides a first indicator in the presence of the tagged article and a second indicator in the absence of the tagged article.

A yet further object of the present invention is to provide an article locator system wherein said app first and second indicators are taken from the group of visual indicators, audio indicators and a combination of visual and audio indicators.

A still yet further object of the present invention is to provide an article locator system wherein said releasable article locator device provides housing incorporating a fastener whereby article locator device selected from the group of pin, clip and hook and loop.

Additional objects of the present invention will appear as the description proceeds.

The present invention overcomes the shortcomings of the prior art by providing an article location system comprising an article locator tag and a computer application (app) responsive to said app whereby said tag can be attached to articles whereby then actuating the smartphone app provides for a local article search task and an outside local search task with the local search task using the phones NFC, such as Bluetooth, to search for the RFID tag and the phones GPS system to search for the GPS tag using a cellular network.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

DESCRIPTION OF THE REFERENCED NUMERALS

Turning now descriptively to the drawings, in which similar reference characters denote similar elements throughout the several views, the Figures illustrate the medical apparatus of the present invention. With regard to the reference numerals used, the following numbering is used throughout the various drawing figures.

10 luggage location system
12 luggage
14 locator chip
16 smartphone
18 locator application
20 long range GPS locator
22 close range RFID locator
24 download step
26 chip number entering step
28 system activation step
30 locator chip attachment step
32 long range locator screen
34 short range locator screen
36 unique ID number
38 pin
40 clip
42 hook and loop-type fastener
44 phone menu
46 open locator application step
48 options (chip number)
50 GPS homing optionally
52 short range (NFC) homing option
54 activate homing choice step
56 location display
58 locator chip internal power source
60 map display activation
62 automatic close range activation
64 following screen pointer
66 directional homing arrow
68 homing display activation
U user

BRIEF DESCRIPTION OF THE DRAWING FIGURES

Figure 2:
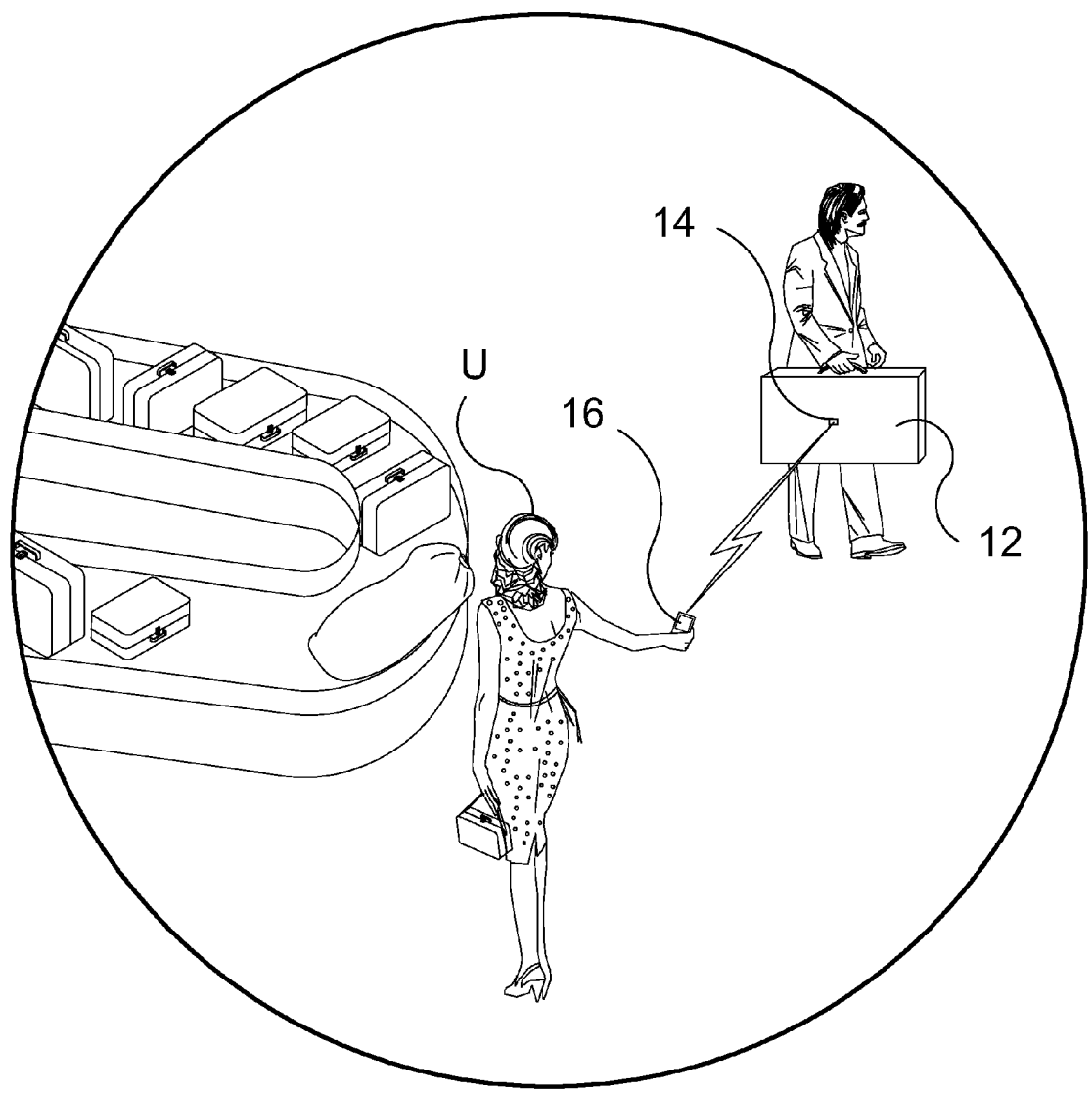
Figure 3:
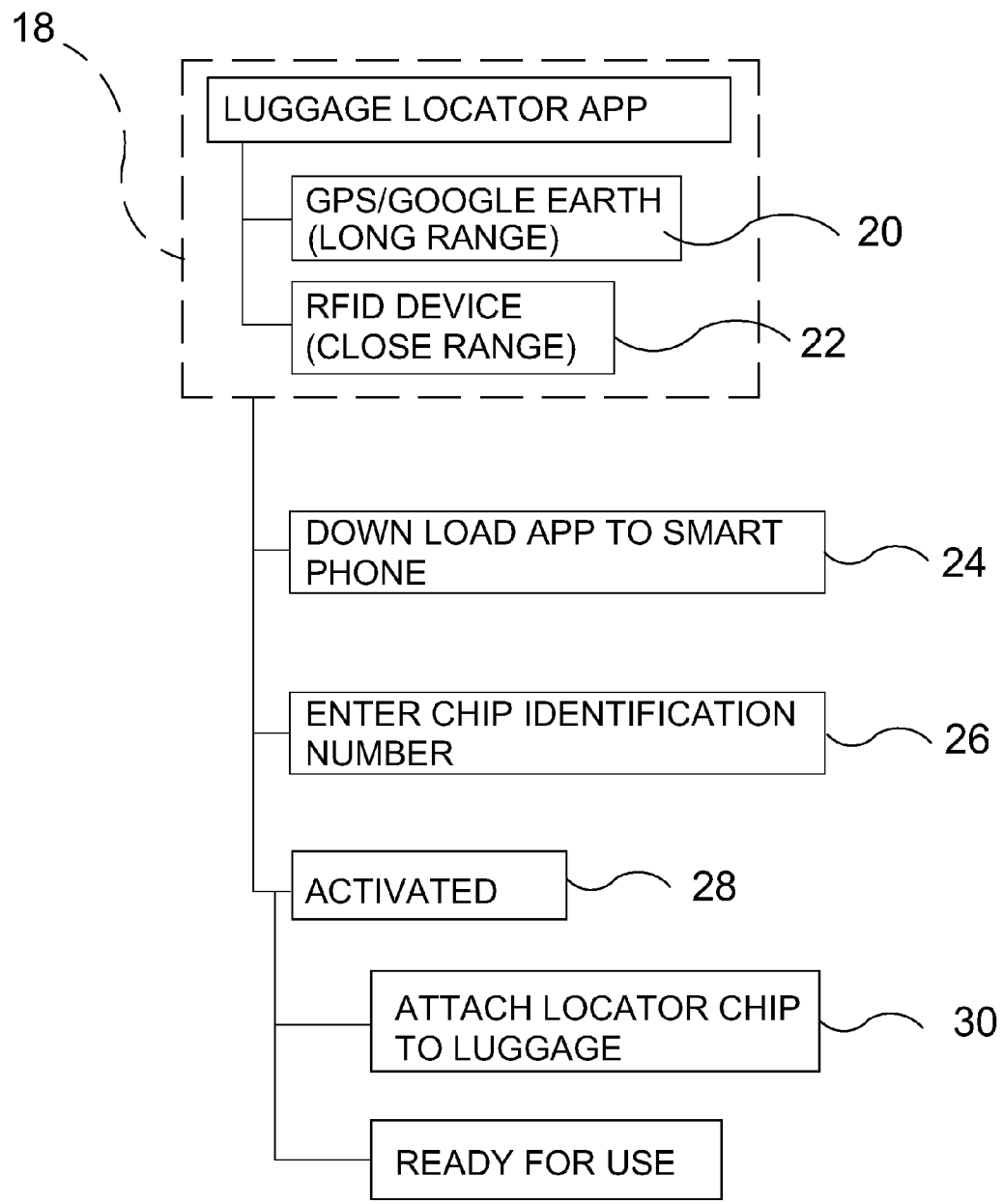
Figure 4:
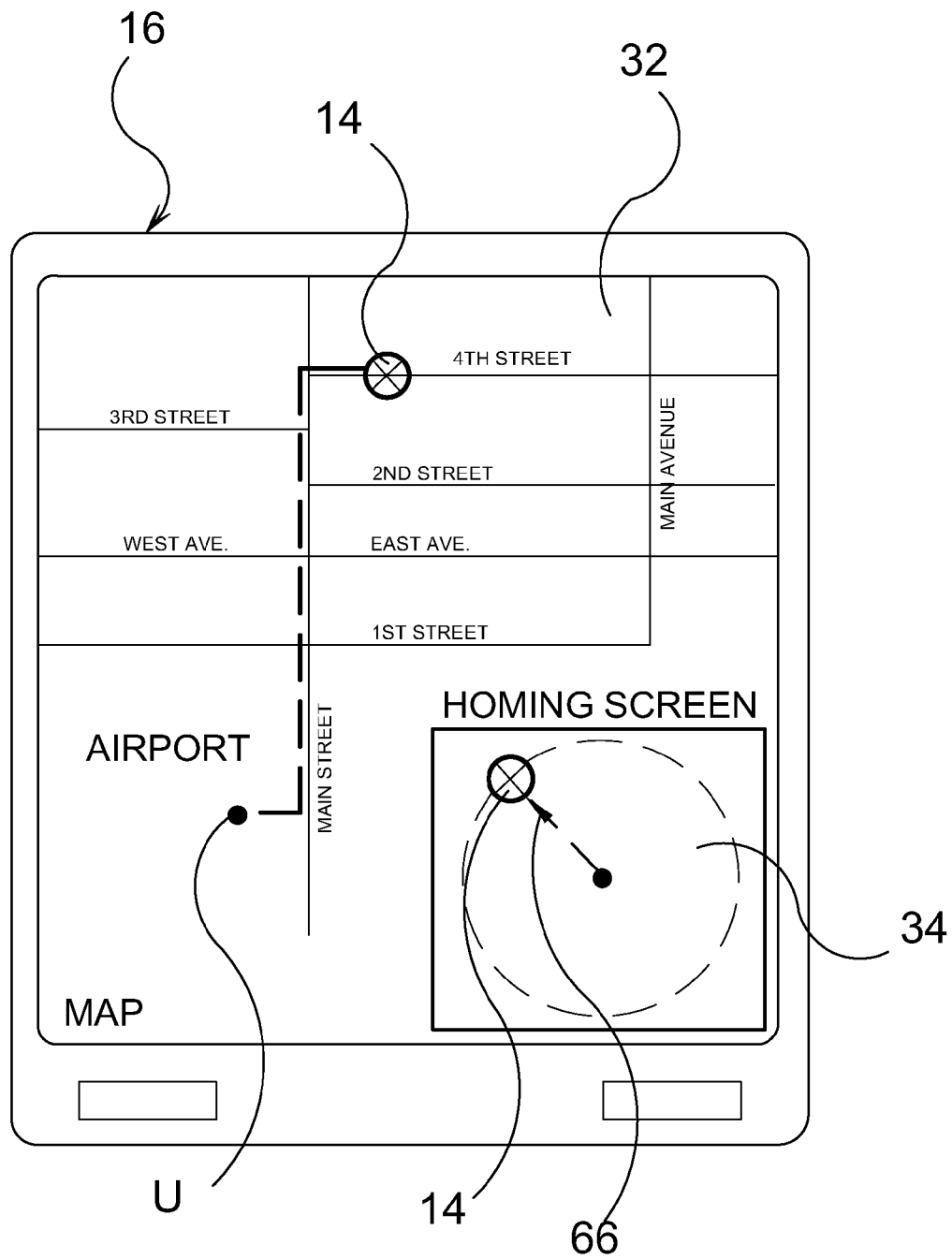
Figure 5:
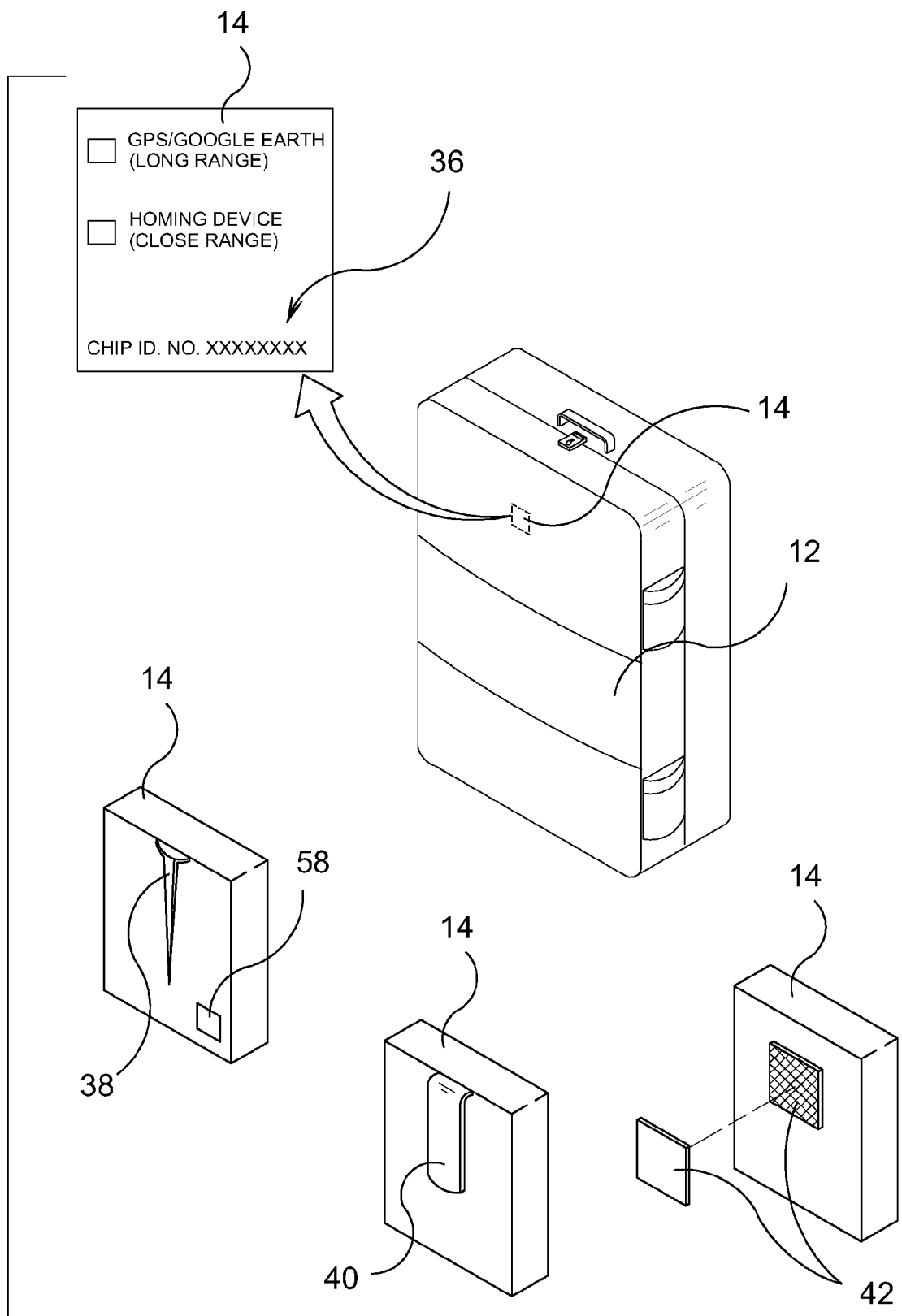
Figure 6:
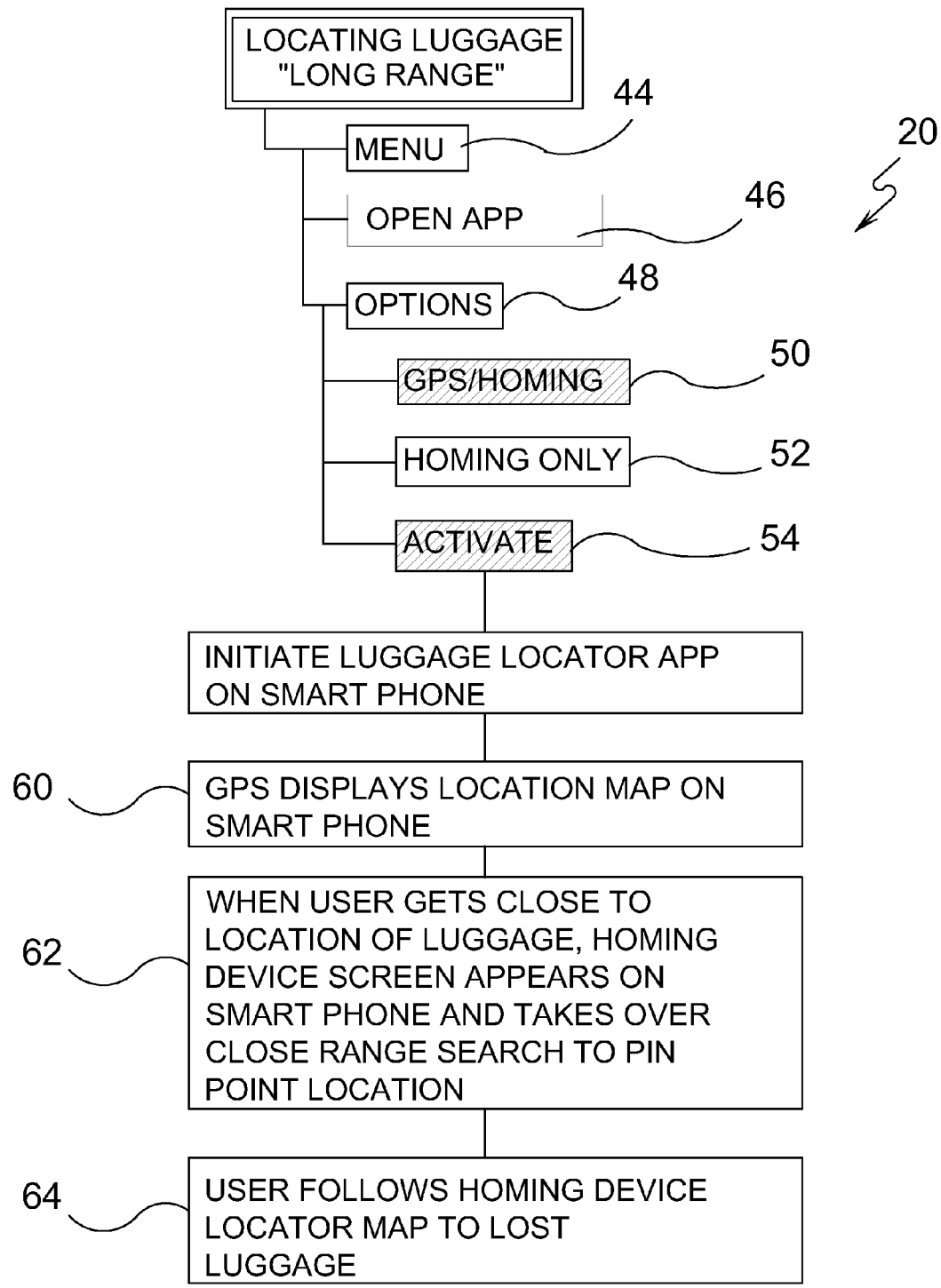
Figure 7:
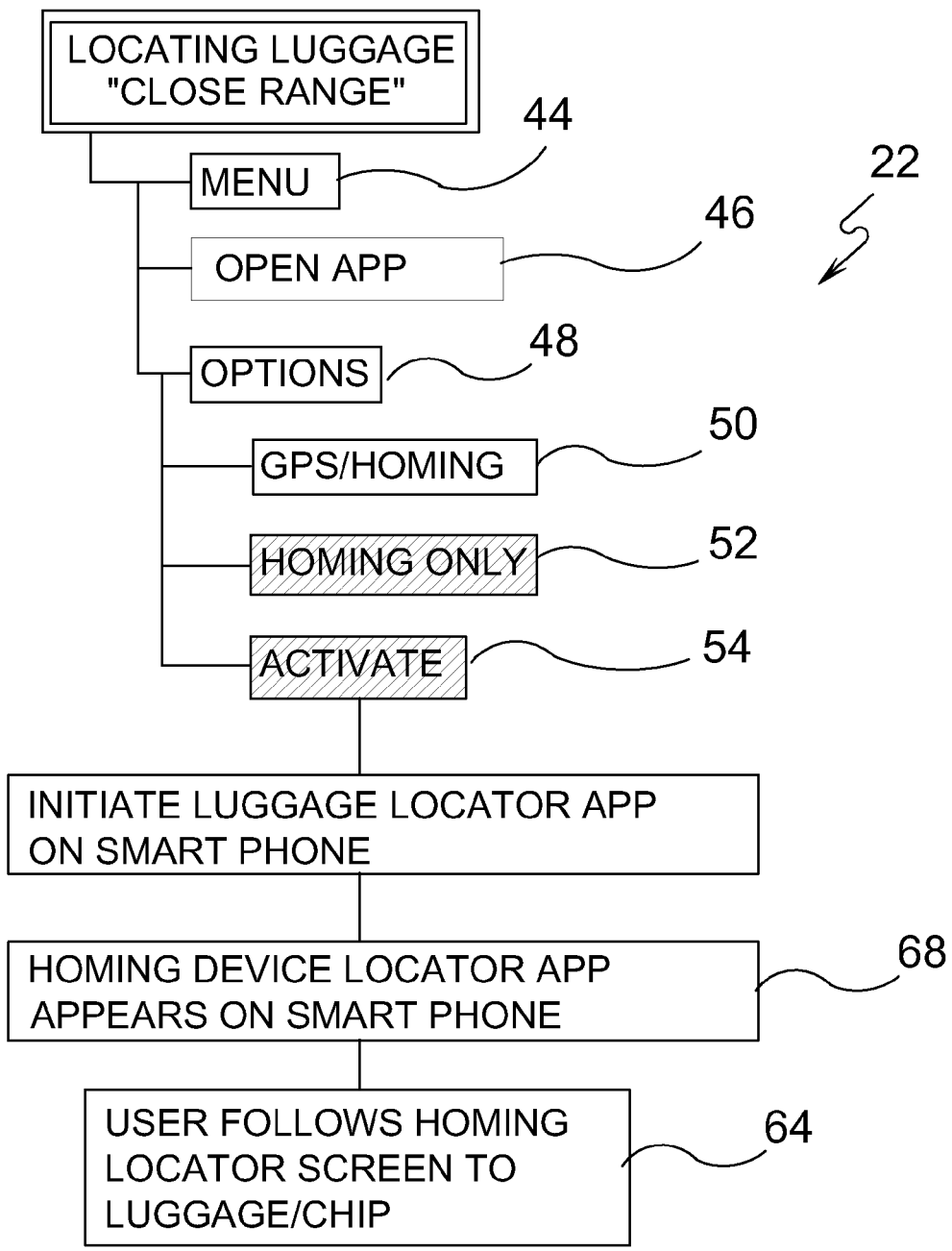

In order that the invention may be more fully understood, it will now be described, by way of example, with reference to the accompanying drawing in which:

FIG. 1 is an illustrative view of the present invention in use.
FIG. 2 is an illustrative view of the present invention in use.
FIG. 3 is a flow chart of the present invention.
FIG. 4 is an illustrative view of the present invention.
FIG. 5 is an illustrative view of the present invention.
FIG. 6 is a flow chart of the present invention showing the long range GPS locator.
FIG. 7 is a flow chart of the present invention showing the short range RFID locator.

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of the present invention in use. The present invention is a luggage location system 10 operated through a smart phone 16 in conjunction with a locator chip 14. An app (smartphone application) can be downloaded into a user's (indicated at U) smart phone 16 providing GPS long distance location and a homing device for short range location. This sequence triggered by the application will be discussed further below. The locator chip is attached (or possibly embedded) to (or in) the user's luggage. Additionally, it should be noted that the locator chip could be placed within the luggage among the items contained therein.

Referring to FIG. 2, shown is an illustrative view of the present invention in use. The luggage location system operated through a smart phone in conjunction with a locator chip assists the user in finding luggage, no matter where the location of said luggage.

Referring to FIG. 3, shown is a flow chart of the present invention. Shown is the luggage location system app down load and installation procedure. The object locator app is indicated at 18 and is downloaded into the smartphone through an application store connection as is known through examples such as I-tunes and the like. Chips 14 would be provided, each with a unique identification number provided to the purchaser. The chips, as envisioned in the preferred embodiment of the invention would be an active RFID chip that allows for both the long range GPS locator 20 portion of the invention to be activated and the short range RFID locator to be implemented as desired. After the locator application 18 has been downloaded, the unique chip identification number is entered into the phone 16 which allows the phone 16 to directly query the chip 14. The locator chip 14 is then attached to the object that the user U wishes to track which is indicated in the drawing at 30. This attachment could be of a number of various types such as a pin, a clip, hook and loop type fasteners, adhesive, or the chip could be alternatively embedded into the object to be tracked. After the Smartphone 16 queries the chip 14 with its unique identification number the system is activated as seen at 28 in the Figure. The system 10 is now ready for use.

Referring to FIG. 4, an example of the present invention in use is seen. The Figure shows an example of the type of screen the user U would encounter when the application 18 is activated. The screen would, in the contemplated embodiment, provide a long range map portion indicated at 32 and a short range locator or homing portion indicated at 34. In the embodiment shown herein, the long range map portion 32 is shown with a map overlay having streets and other landmarks labeled along with the location of the user U and locator chip 14. This long range location procedure will be described further below in discussing FIG. 6. Additionally shown is the short range portion 34 of the screen. In the embodiment described herein, this is substantially a directional locator and this will be discussed in more detail in regards to FIG. 7.

Referring to FIG. 5, shown is an illustrative view of the present invention. Shown is the luggage location chip 14 installed within luggage 12 and various contemplated means of attachment to the luggage 12. For example, shown in the Figure are a pin indicated at 38, a clip indicated at 40 and a hook and loop type fastening arrangement, as seen at 42. Also clearly indicated in the Figure is the unique chip ID at 36. The identification number 36, in combination with the smartphone locator application 18 allows the user U to discretely interrogate a specific locator chip 14 if the user U happens to have more than one in operation at a time. It should also be emphasized that other attachment means could be used: various adhesives, for example, or the chip 14 itself could be placed within the luggage 12 along with the other objects contained therein (not shown), or the chip 14 could be embedded in the frame or fabric of the luggage 12 itself.

Referring to FIG. 6, shown is a flow chart of the present invention. Shown is a flow chart of long range location of luggage 12 (or other object) and its associated locator chip 14 using the present invention. The locator application 18 would preferably have an icon or the like on the phone menu 44 which, when selected by the user U would start the process, as indicated at 46. It is contemplated that the user would first be presented with an options menu 48 which would ask for the input of the unique chip ID number 36. Then the options would be presented asking the user U to choose between the (long range) GPS homing option 50 or the short range (NFC) option 52. Activating the choice is shown at 54. When the long range locator is chosen, the location map display 56 is activated and the phone 16 sends a signal to the locator chip 14 in a similar manner as it would dial another phone or, potentially, point at a website. It should be noted that the locator chip 14 includes an internal power source 58 as seen in FIG. 5. When it receives the signal from the phone 16, it queries GPS satellites for its location and transfers the data back to the phone 16 which, as seen in FIG. 4, displays a map screen 32 showing the user U both the phone 16 current location and the location of the queried chip 14. This is shown in the present Figure at 60. It is also contemplated that the chip could send signals at predetermined intervals through text messages using the SMS present in the phone to indicate its location. With the application 18 monitoring the location of both the chip 14 and the phone 16 when the distance is determined to be small enough the second, short range homing procedure is automatically started as indicated at 62. As will be discussed below, the user U then simply follows the directional indicator to the precise location of the chip 14 and its associated luggage 12 shown at 64 in the Figure.

Referring to FIG. 7, shown is a flow chart of the present invention. Shown is a flow chart of close range location of luggage 12 and locator chip 14 using a smartphone 16. As was described in the discussion of FIG. 6, the user U opens the application 18 as indicated at 46 from the phone menu at 44.

At the option stage shown at 48 the unique chip number 36 is entered and the choice here is made for the short range (NFC) homing option at 52 and it is activated at 54. Referring back to FIG. 4, the homing screen 34 is displayed (this is indicated at 68) with a directional arrow or pointer 66 that allows the user U to determine the direction of the luggage 12 or other object that locator chip 14 is attached to.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method of tagging and subsequently tracking and locating an object using a smartphone comprising the steps of:
    providing at least one locator chip attachable to the object;
    providing a long range locator interface;
    providing a short range locator interface;
    attaching said at least one chip to a desired object;
    using an app on said smartphone to activate said long range and said short range locator interfaces; and
    the smartphone showing in a separate GPS display and a homing display simultaneously on a screen, said GPS display showing a long range location of said attached chip in relation to itself and said homing display including a short range directional arrow when said attached chip is within a certain distance.

2. The method according to claim 1 where said at least one locator chip includes an internal power source.

3. The method according to claim 2 where each of said at least one locator chip includes a unique identification number and where said unique identification number is entered in the smartphone to activate said long range and said short range locator interfaces.

4. The method according to claim 3 where said smartphone display of the long range location of said at least one locator chip in relation to the smartphone is overlaid on a map display.

5. The method according to claim 4 where said smartphone map display of the long range location of said at least one locator chip in relation to the smartphone utilizes GPS receivers within both the smartphone and said at least one locator chip.

6. The method according to claim 3 where each of said at least one locator chip further includes an RFID chip.

7. The method according to claim 6 where said locator chip and the smartphone communicate with the Bluetooth protocol.

8. A method of tagging and subsequently tracking and locating an object using a smartphone comprising the steps of:
    providing an app on said smartphone for locating and tracking said object;
    providing at least one locater chip responsive to said app and an internal power source attachable to the object, said locater chip having a unique identification number;
    providing a long range locater interface, said long range locater interface utilizing GPS receivers in the smartphone and in each of said at least one locater chip;
    providing a short range locater interface;
    attaching said at least one chip to said object;
    using said app to enter said unique identification number to activate said long range and said short range locater interfaces; and
    showing on a screen of the smartphone a long range location of said attached chip and a short range directional arrow in separate displays simultaneously on said screen when said attached chip is within a certain distance calculated by comparing the GPS receiver locations.

9. The method according to claim 8 where said smartphone display of the long range location of said at least one locator chip in relation to the smartphone is overlaid on a map display.

10. The method according to claim 9 where each of said at least one locator chip further includes an RFID chip.

11. The method according to claim 10 where said locator chip and the smartphone communicate with the Bluetooth protocol.

12. The method according to claim 8 where said long range locator interface and said short range locator interface are downloadable into the smartphone.

13. The method according to claim 12 where said at least one chip is attached using an attachment is selected from the group consisting of pins, clips, and hook and loop-type fasteners.

14. The method according to claim 8 further where said long range interface further includes a step where said at least one locator chip sends an SMS signal to the smartphone at predetermined intervals.

15. The method according to claim 14 where said long range locator interface and said short range locator interface are downloadable into the smartphone.

16. The method according to claim 15 where each of said at least one locator chip further includes an RFID chip and where said locator chip and the smartphone communicate with the Bluetooth protocol.

* * * * *